H. R. Ladd,
Axle Set.

No. 87,571.  Patented Mar. 9, 1869.

Witnesses.
Geo. W. Nowill.
J. Cohues.

Inventor.
H. R. Ladd.

H. R. LADD, OF ORWELL, OHIO.

Letters Patent No. 87,571, dated March 9, 1869.

---

IMPROVED AXLE-SET.

---

The Schedule referred to in these Letters Patent and making part of the same.

---

To all whom it may concern:

Be it known that I, H. R. LADD, of Orwell, in the county of Ashtabula, and State of Ohio, have invented certain new and useful Improvements in Axle-Set; and I do hereby declare that the following is a full and complete description of the construction and operation of the same, reference being had to the accompanying drawings, making part of this specification, in which—

Figure 1:
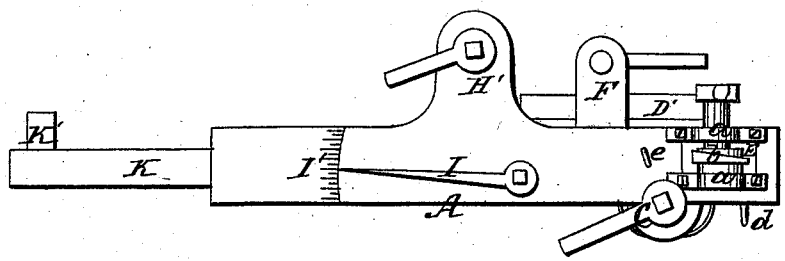
Figure 2:
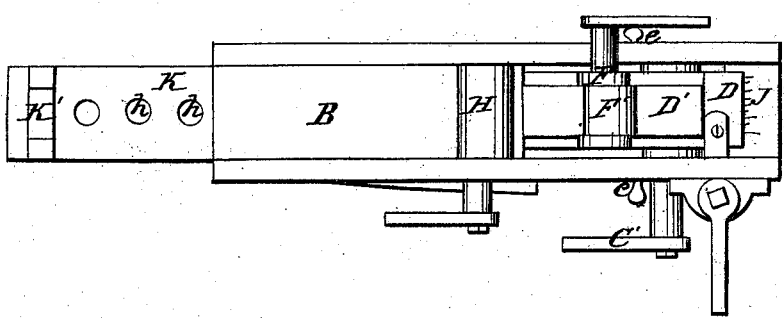
Figure 3:
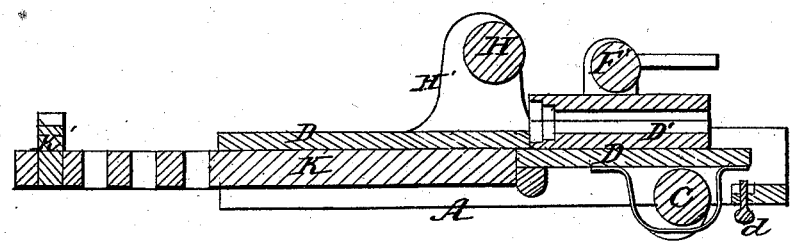

Figure 1 is a side view of the machine.
Figure 2 is a plan view.
Figure 3 is a longitudinal section.

Like letters of reference refer to like parts in the views.

The nature of this invention relates to the construction and arrangement of a machine for bending or setting the axles of axle-trees for carriages, &c., at an angle to correspond to the dish of the wheels intended to run thereon, and consists of the parts, and is operated in the manner, as herein described.

In fig. 1, A represents the frame of the machine.

At one end is formed the platform B, and at the opposite end, the devices for bending or setting the axle.

To the under side of the frame, and near the end, is secured the cam C, having bearings in the sides of the frame, and provided on the end with a lever, C'.

This cam is for the purpose of adjusting the platform D, on which rests the box D', the object of which will be referred to hereafter.

E is another cam, having bearings in the lugs a a, the end of the shaft being provided with a lever, as is the cam C.

Round this cam passes a band, b, which is secured to the platform D, and which serves to move the platform sidewise, while the cam C moves it up or down.

Secured to the platform D are the uprights or standards F, between which is the cam F', being provided with a lever, as are the others referred to. This cam is to secure the box D', which receives the axle when it is to be set.

H is a cam, having its bearings in the uprights H', which form part of the frame. This cam is to aid in holding the axle secure while in the act of setting or bending the same.

To the side of the frame is secured the pointer I and scale I', a pointer and scale, J, being shown at the end of the platform D. These are to determine the angle at which the axle is to be bent.

The cam C, together with the pointer I, determine and place the platform in the desired angle that the axle is to be bent, up or down.

When the cam C is turned by means of the lever C', the platform D is raised, and, as the end of said platform is secured to the shaft on which the pointer I is placed, the pointer is moved to the desired angle, which thus adjusts the angle of the axle, and it is then secured in place by means of the set-screw d, fig. 3.

The adjustment sidewise of the angle of the axle is next indicated by the pointer J and scale, and the platform adjusted by means of the cam E, which is then secured by means of the set-screws e, which prevent the platform from moving further than the angle required.

The axle to be bent is placed on the platform B, the end passing into the box D', before referred to, which is secured by means of the cams F' and H, the other end resting on the strip K', which may be made to slide, so as to be adjusted to the length of the axle; or it may be provided with holes, h, and the block K', which keeps the end in place, moved nearer to or further from the platform, according to the length of the axle.

After the axle is secured in place, it is set in the angle desired by moving the cams, as before described, until the pointers show on the scales the angles desired, the cam C adjusting it to the angle up or down, and the cam E sidewise in either direction, as the desired angle may determine.

What I claim as my improvement, and desire to secure by Letters Patent, is—

The combination of the several devices herein described, for holding and bending axles, all constructed, arranged, and operating as set forth.

H. R. LADD.

Witnesses:
A. J. MARVIN,
J. J. ELWELL.